United States Patent [19]
Arai

[11] Patent Number: 5,511,441
[45] Date of Patent: Apr. 30, 1996

[54] LOCKING/UNLOCKING MANIPULATION MECHANISM DISPOSED ON THE HANDLEBARS OF BABY CARRIAGE

[75] Inventor: Yuichi Arai, Tokyo, Japan

[73] Assignee: Combi Corporation, Tokyo, Japan

[21] Appl. No.: 127,369

[22] Filed: Sep. 28, 1993

[30] Foreign Application Priority Data

Oct. 27, 1992 [JP] Japan .................... 4-080170 U

[51] Int. Cl.$^6$ .................... B62B 7/08; B62B 9/20
[52] U.S. Cl. .................... 74/501.6; 74/551.3; 280/642; 280/47.38
[58] Field of Search .................... 74/501.6, 502, 74/551.3; 280/47.36, 47.371, 47.38, 642

[56] References Cited

U.S. PATENT DOCUMENTS

| | | | |
|---|---|---|---|
| 4,577,877 | 3/1986 | Kassai | 74/551.3 X |
| 4,733,882 | 3/1988 | Kassai | 74/551.3 X |
| 4,832,361 | 5/1989 | Nakao et al. | 74/501.6 X |
| 5,205,579 | 4/1993 | Kato et al. | 74/502 |

FOREIGN PATENT DOCUMENTS

| | | | |
|---|---|---|---|
| 494701 | 7/1992 | European Pat. Off. | 280/47.36 |
| 1-297372 | 11/1989 | Japan | 280/642 |
| 3-96474 | 4/1991 | Japan | 280/47.36 |

*Primary Examiner*—Richard M. Lorence
*Attorney, Agent, or Firm*—Sughrue, Mion, Zinn, Macpeak & Seas

[57] ABSTRACT

A locking/unlocking manipulation mechanism for locking and unlocking the locking device of a baby carriage which precludes the collapsing of the carriage. The locking/unlocking manipulation mechanism includes a housing, a pulley rotatably supported in the housing, a wire connected at one end to the pulley and at the other end to the locking device, a manipulation button including a drive plate extending vertically from the main body of the button into the housing and engaged with a portion of the pulley and a sliding prevention stopper slidably disposed in the upper portion of the housing. When the button is urged into the housing the drive plate causes the pulley to rotate to thereby tension the wire and unlock the locking device. The stopper includes a sliding prevention plate extending from the bottom thereof into the housing so that the tip of the prevention plate can selectively contact the drive plate to prevent the button from being moved.

11 Claims, 4 Drawing Sheets

LOCKING/UNLOCKING MANIPULATION MECHANISM DISPOSED ON THE HANDLEBARS OF BABY CARRIAGE

BACKGROUND OF THE INVENTION

1. Field of the Invention

The present invention relates to a manipulation mechanism for selectively locking or unlocking the locking mechanism of a baby carriage, and more particularly relates to a remote manipulation mechanism disposed on the handlebars of a baby carriage.

2. Background

Collapsible baby carriages are known. Also, it is know to design the handlebars so that they can alternatively be positioned so as to extend forwardly or rearwardly of the seat so that the carriage can be pushed in the backward or forward direction, respectively. Each of these carriages includes a locking device for locking the carriage in the upright position and locking the handlebars in the forward or backward position. A locking/unlocking manipulation mechanism is disposed at the upper end of the handle bars so that the locking device can be activated from a remote, more convenient position, as disclosed in Japan Utility Model Applications (OPI) Nos. 48866/86, 139859/86 and 34766/88 (the term "OPI" as used herein means an "unexamined published application").

The manipulation mechanism includes a manipulation lever pivotally supported at the central portion thereof in a housing so as to be rotatable and a remote manipulation wire anchored at one end thereof to an end of the lever and at the opposite end to the locking device. The manipulation portion of the lever, which projects from the housing, is rotated rightward or leftward to operate the wire for the manipulation mechanism.

With such a design, the operating stroke of the remote manipulation wire is a function of the ratio of the distance between the point at which the wire is secured to the lever and the pivot point at the central portion of the manipulation lever to the distance between the pivot point and the butt of the lever where the manipulation force is applied. Therefore, the latter distance needs to be maximized in order to minimize the required manipulation force to actuate the locking mechanism. However, when the distance between the pivot point and the butt of the lever is increased, the size of the locking/unlocking manipulation mechanism becomes correspondingly larger. On the other hand, if the operation stroke of the wire is increased while the distance between the pivot and the butt of the lever is decreased, the required actuation force becomes larger in inverse proportion to the ratio, making it difficult to rotate the lever and actuate the locking mechanism. Further, the locking device can be inadvertently unlocked if the manipulation lever projecting from the housing is accidentally touched during the movement of the baby carriage. To prevent such a problem, the shape of the lever or the construction for engaging the lever with the housing needs to be specially designed. However, such a special design results in a complicated assembly of the baby carriage and increased cost thereof.

The present device was made in order to solve the problems described above. Accordingly, it is an object of the present invention to provide such a locking/unlocking manipulation mechanism on the handlebars of a baby carriage where the operation stroke of a manipulation wire can be made sufficiently long although the manipulation space is small.

It is another object of the invention to provide such a locking/unlocking manipulation mechanism on the handlebars of a baby carriage which includes a sliding prevention stopper for preventing the manipulation lever from being inadvertently moved so that the locking means will remain locked.

SUMMARY OF THE INVENTION

The locking/unlocking manipulation mechanism provided in accordance with the present invention comprises a housing, a disk-shaped wire moving pulley rotatably supported in the housing, a manipulation lever including a drive plate extending vertically from the main body of the lever into the housing and engaged with a portion of the pulley, and being movably disposed in the housing so that a portion of the body is exposed outside the bottom of the housing and a sliding prevention stopper slidably disposed in the upper portion of the housing so as to be horizontally slidable and including a sliding prevention plate extending from the bottom of the main body of the stopper into the housing so that the tip of the prevention plate can selectively contact the drive plate to prevent the lever from being moved.

The above and other objects, features and advantages of the invention will become more apparent from the following detailed description of the invention when read in conjunction with the accompanying drawings.

DETAILED DESCRIPTION OF THE PREFERRED EMBODIMENTS

Figure 1:
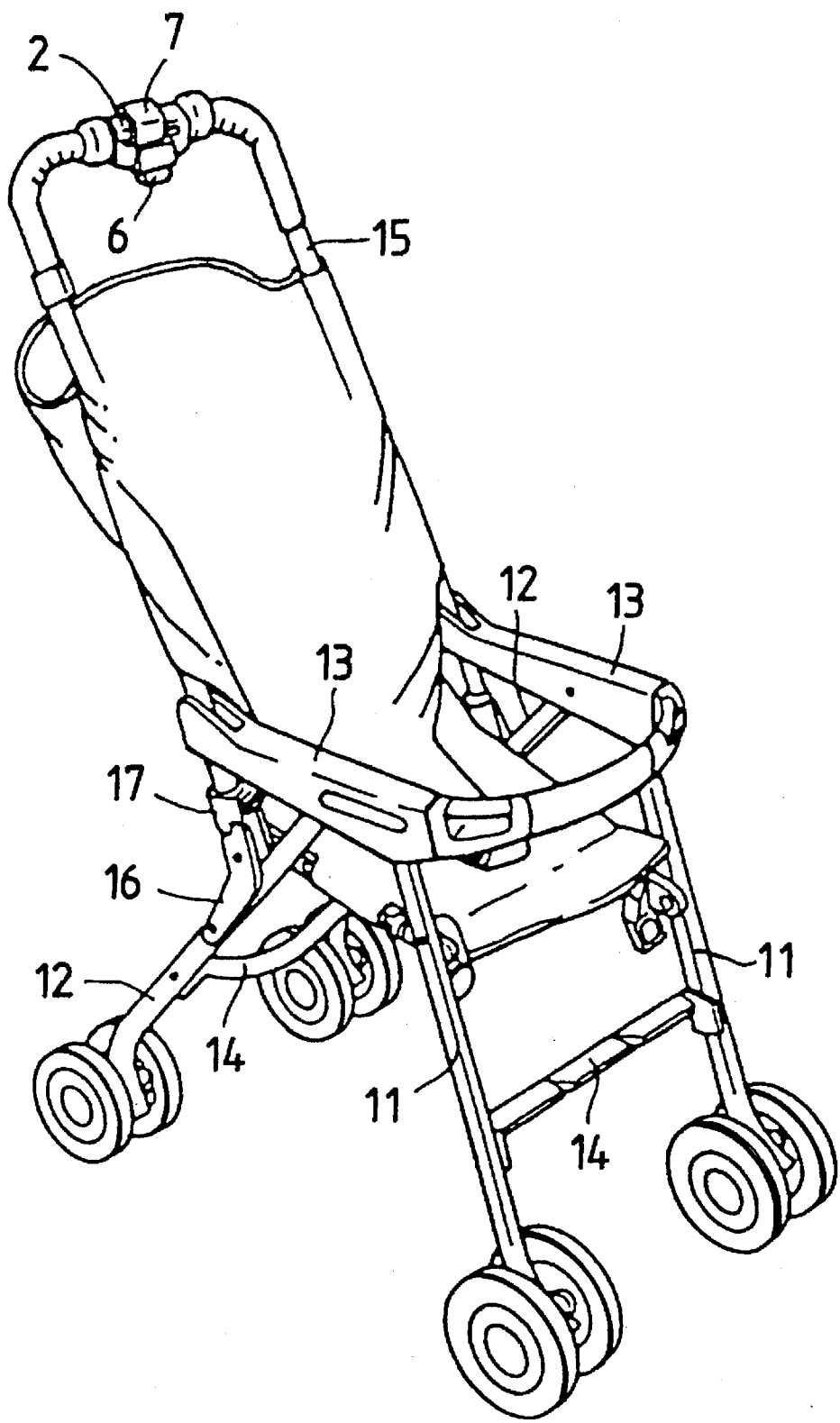
FIG. 1 is a perspective view of a baby carriage having a locking/unlocking manipulation mechanism which is an embodiment of the present device.
Figure 3:
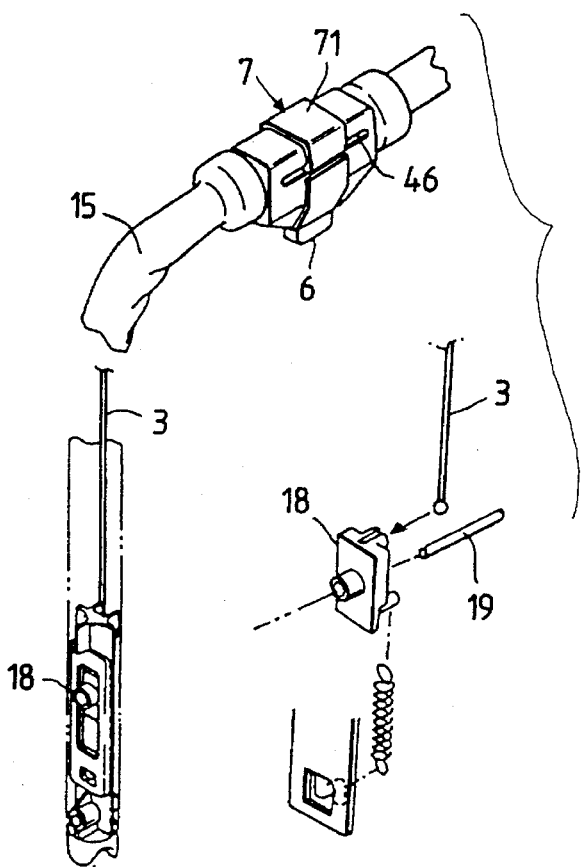
FIG. 3 is an exploded perspective view of another major part of the carriage.
Figure 2:
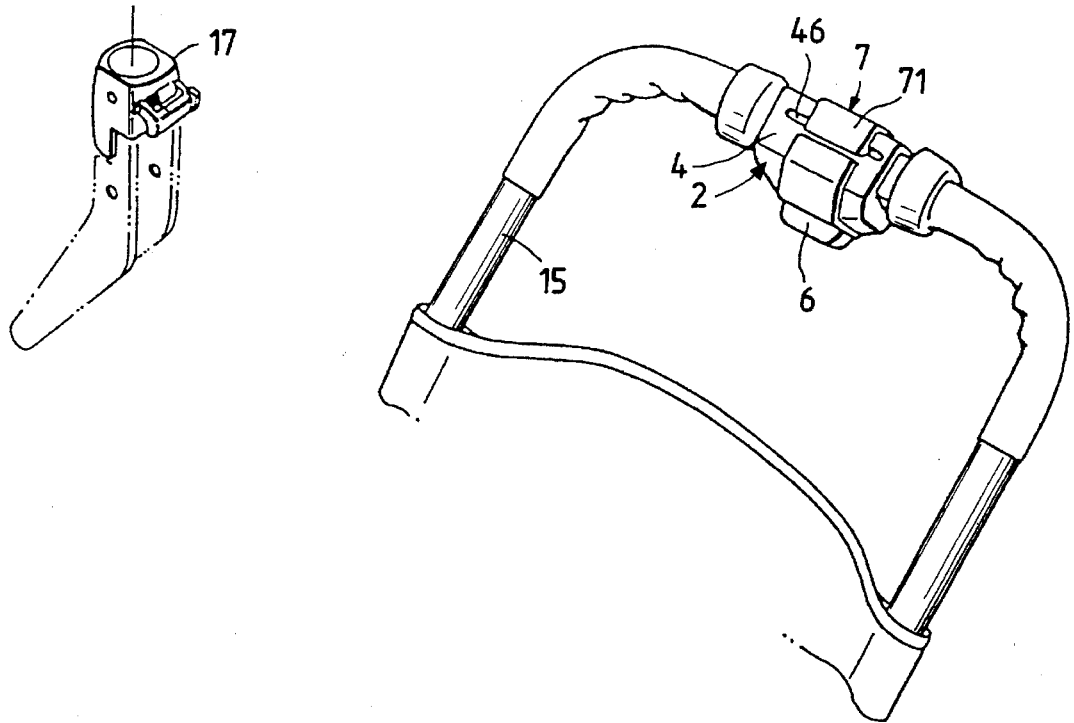
FIG. 2 is an enlarged perspective view of a major part of the carriage.

An embodiment of the present device is hereafter described with reference to the drawings attached hereto.

FIGS. 1–6 show a baby carriage including a locking/unlocking manipulation mechanism 2 for actuating the locking mechanism 17 of the carriage which locks the carriage in the upright state. The carriage also includes a pair of front legs 11, a pair of rear legs 12, a pair of armrests 13, coupling bars 14 extending along the width of the carriage and coupling the legs and the armrests together, a pair of handlebars 15 pivotally coupled at the lower ends thereof to the rear legs, collapsing brackets 16, the locking mechanism 17, sliders 18, and drive pins 19.

The handlebars 15 are coupled to each other to form an inverted U, and are pivotally coupled at the lower ends thereof to the midportion of the rear legs 12 by the collapsing brackets 16.

Each of the locking mechanisms 17 is disposed slightly above the pivot point of the lower end of the associated handlebar 15 and the collapsing bracket 16 and is movable up and down. When the baby carriage is in the upright (uncollapsed) state, the locking mechanism 17 is fitted on the collapsing bracket 16 at the upper end thereof to prevent the bracket from moving in such a direction as to allow the rear leg 12 and the handlebar 15 to be rotated relative to each other so that the baby carriage is prevented from being collapsed. The locking mechanism 17 can be disengaged by moving the sliders 18 upwardly using manipulation wires 3 extending from the locking/unlocking manipulation mechanism 2 provided at the upper ends of the handlebars 15.

In more detail, each drive pin 19 projects from the side of the slider 18 and is engaged with a portion of the locking means 17. The slider 18 and the drive pin 19 are equivalent to those disclosed in Japan Utility Mode Applications (OPI) Nos. 48866/86 and 34766/88, and are therefore not described in detail herein.

The locking/unlocking manipulation mechanism 2 includes a housing 4, a wire moving pulley 5 rotatably supported in the housing, a manipulation button 6 for rotating the pulley, and a stopper 7 for preventing the lever from being pushed deeper into the housing and, attendantly, from rotating the pulley 5. Rotation of the pulley by the manipulation button 6 causes the manipulation wire to be pulled upwardly to thereby unlock the locking mechanism 17.

The housing 4 is shaped as a parallelpiped, and has handlebar openings 41 at opposite lateral ends thereof, a lever opening 42 in the lower portion thereof, and a sliding hole 43 in the upper portion thereof. The upper ends of the handlebars 15 are fitted in the handlebar openings 41, the manipulation button 6 is fitted in the opening 42 so that the lever is movable up and down and the stopper 7 is fitted in the sliding hole 43 so that the stopper is laterally slidable therein.

The pulley 5 is disk-shaped having an appropriate thickness, and is rotatably supported by shaft 44 secured to the housing 4. The pulley 5 has a guide groove 51 extending around the circumference thereof and engagement portions 52. The manipulation wires 3 are fitted in the groove 51 and have spherical terminals 31 coupled to the ends thereof which are anchored in the engagement portions 52. An engagement pin 53 projects from one side of the pulley 5 near the peripheral edge thereof and is fitted in the fitting hole 63 of a drive plate 62 extending upwardly from the manipulation button 6 so that movement of the slide plate causes the pulley to rotate.

The button 6 includes a main body 61 and the drive plate 62 extending upwardly therefrom, and is fitted in the housing 4 so that the upper portion of the main body is located in the housing. The tip 64 of the drive plate 62 is L-shaped so that when the stopper is in the position illustrated in FIG. 4, the lower end of the sliding prevention plate 72 contacts the top of the L-shaped tip so that the button 6 is prevented from being urged deeper into the housing 4. However, it is noted that the tip 64 need not be L-shaped. If the tip 64 is not L-shaped, the mechanism 2 is constituted so that the sliding stroke of the stopper 7 is longer so that the lower end of the sliding prevention plate 72 thereof can move into and out of contact with the entire upper end of the drive plate 62.

The housing 4 has guide grooves 45 for guiding the manipulation button 6 into and out of the housing. Juts (not shown) formed on the rear of the main body 61 of the button 6 are fitted in the guide grooves 45 to ensure the precise smooth sliding of the lever along the grooves and to prevent the button from coming off the housing 4. A return spring 65 is disposed in contact with the inner surface of the button 6 at one end of the spring and located in an appropriate position in the housing 4 at the other end of the spring, for urging the lever toward the position shown in FIGS. 4 and 5 where the lever is urged downwardly so that the locking mechanism 17 remains locked.

Figure 4:
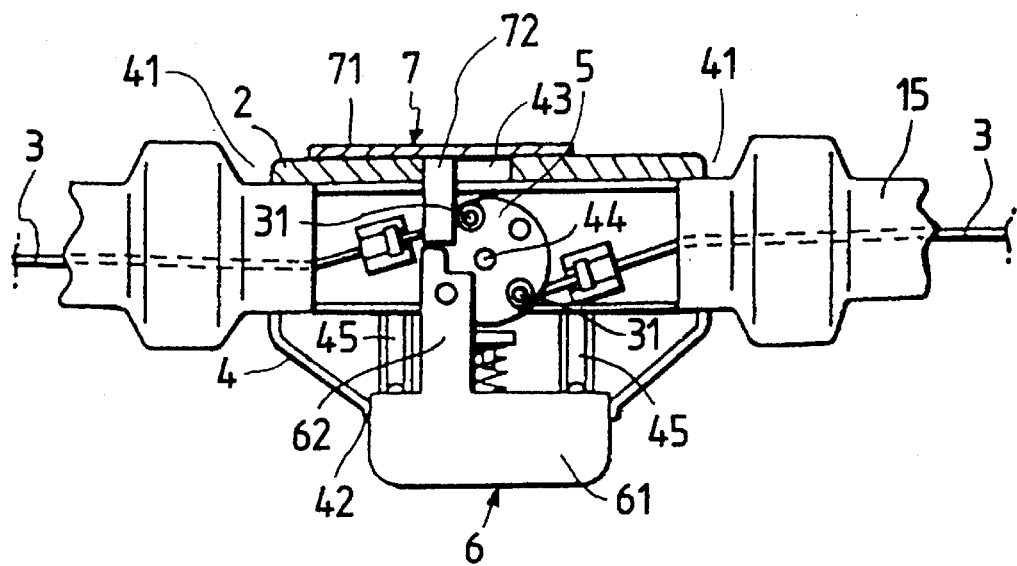
FIG. 4 is a cutaway view of the mechanism illustrating a state in which the manipulation lever is prevented from being actuated.

The stopper 7 prevents the manipulation button 6 from being pushed into the housing 4 so that the lever will not rotate the pulley and the locking mechanism 17 will not be inadvertently unlocked, as shown in FIG. 4. The stopper includes an outer body 71 shaped as an inverted U and slidably fitted on the outer surface of the housing 4, and the sliding prevention plate 72 projecting down from the central portion of the inner surface of the outer body and extending into the housing through the sliding hole 43 of the upper portion thereof. The length of the plate 72 is such that the lower end of the plate is in contact with the upper end of the drive plate 62 of the button 6 when the sliding prevention plate is in a sliding prevention position (FIG. 4), and that the lower end of the sliding prevention plate 72 is out of contact with the upper end of the drive plate 62 when the sliding prevention plate is not in the sliding prevention position (FIG. 5).

Figure 5:
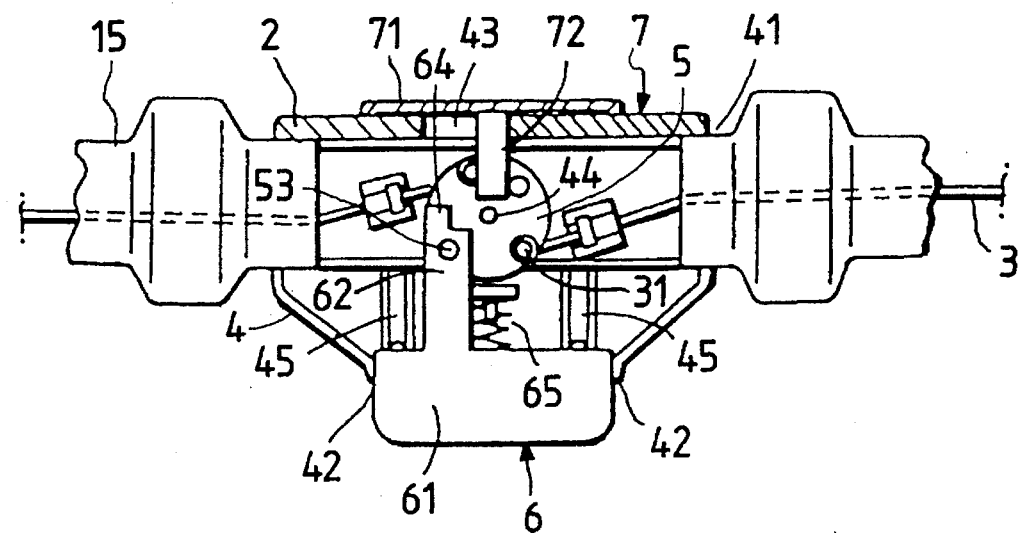
FIG. 5 is a cutaway view of the mechanism illustrating the state in which the lever is capable of being actuated.
Figure 6:
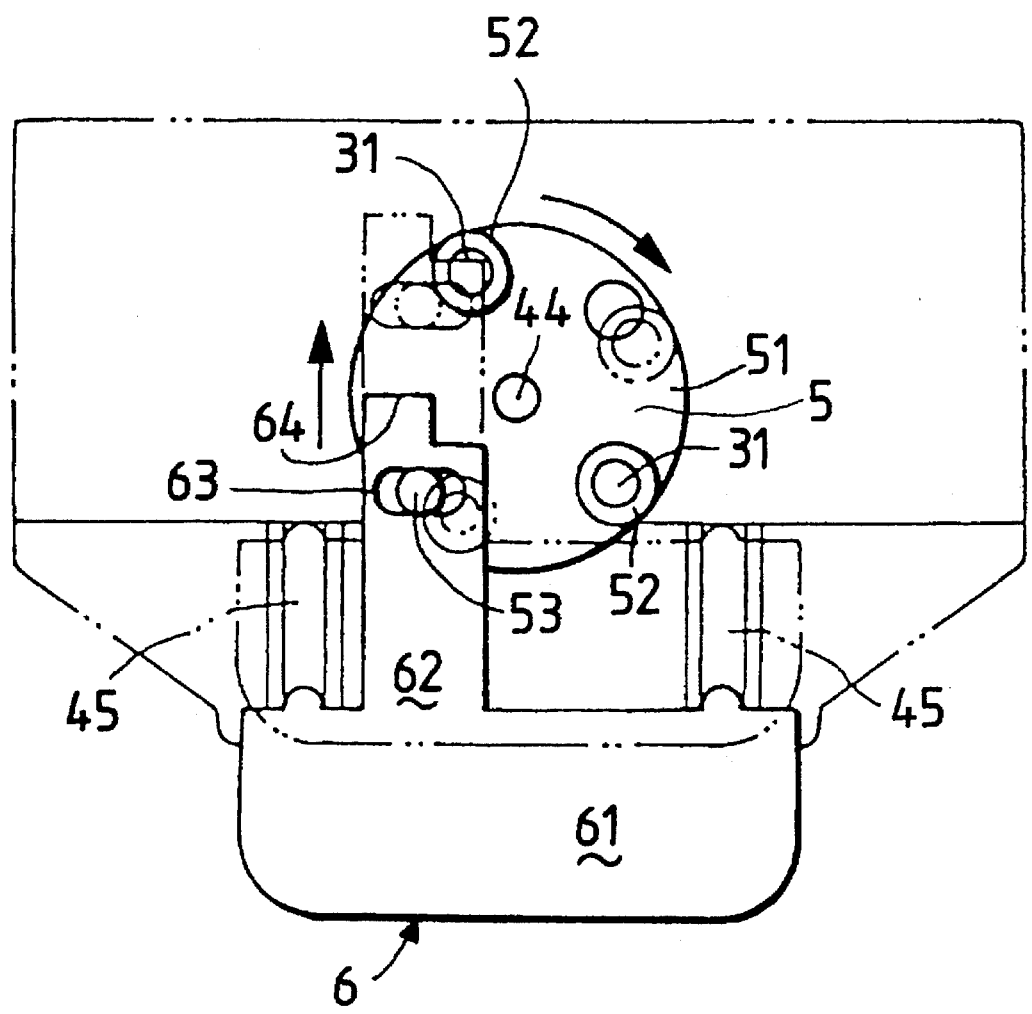
FIG. 6 is a partial view of the mechanism illustrating the relationship between the lever and a wire moving pulley.

The length of the sliding hole 43 is equal to the sliding stroke of the sliding prevention plate 72 so that the plate is not in the sliding prevention position when located at one end of the hole, as shown in FIG. 5, and is in the sliding prevention position when located at the other end of the hole, as shown in FIG. 4. Both sides of the housing 4 have sliding guide grooves 46 in which opposite ends of the outer body 71 of the stopper 7 are respectively slidably fitted.

While the present invention has been particularly shown and described with reference to particular embodiments thereof, it will be understood by those skilled in the art that various changes in form and details may be effected therein without departing from the spirit and scope of the invention as defined by the appended claims.

I claim:

1. A manipulation mechanism provided on the handlebars of a baby carriage for locking and unlocking a pair of locking means of said carriage, comprising:

a housing;

a single wire moving pulley rotatably supported in said housing, said pulley having a pair of wires wound at least partially therearound, first ends of the wires being connected to said pulley and opposite second ends of the wires being adopted to be respectively connected to said pair of locking means;

a manipulation button including a main body and a drive plate extending from the main body into said housing and engaged with a portion of said pulley, said button being slidably fitted in said housing so that a portion of said main body is exposed outside said housing, inward movement of said button causing said pulley to rotate and attendantly the wires to respectively unlock the pair of locking means; and a sliding prevention stopper slidably disposed in said housing, said stopper including a sliding prevention plate extending therefrom and into said housing so that a distal end of said prevention plate can be selectively placed in contact with said drive plate to prevent said button from being moved.

2. The manipulation mechanism according to claim 1, wherein a distal end of the drive plate is L-shaped including a protruding portion so that said distal end of the sliding prevention plate can be selectively contacted with only said protruding portion of the drive plate.

3. The manipulation mechanism as recited in claim 1, further comprising slide means for supporting said stopper so as to be slidable with respect to said housing, said slide means being separate from said sliding prevention plate.

4. A manipulation mechanism provided on the handlebars of a baby carriage for locking and unlocking a pair of locking means of said carriage, comprising:

a housing;

a pulley rotatably disposed in said housing;

a pair of wires connected at one end thereof to said pulley and adapted at another opposite end thereof to be connected to the pair of locking means, respectively;

actuating means, operatively connected to said pulley, for selectively actuating rotation of said pulley so that the wires are wound therearound and, attendantly, said wires respectively disengage the pair of locking means; and preventing means for selectively preventing said actuating means from being actuated so that said pulley is thereby prevented from being rotated to prevent the pair of locking means from being inadvertently unlocked, wherein said actuating means includes a button slidably disposed in said housing, said button including a drive plate extending therefrom and connected to said pulley, wherein when said button is pushed inwardly said pulley is caused to rotate to thereby tension said wire and unlock the pair of locking means.

5. The manipulation mechanism of claim 4, further comprising a spring for urging said button outwardly from said housing.

6. The manipulation mechanism of claim 4, wherein said preventing means is slidably disposed in said housing between first and second positions, wherein in said first position said preventing means abuts against said drive plate to thereby prevent said button from being moved inwardly and in said second position said preventing means is displaced from said drive plate allowing inward movement of said drive plate.

7. The manipulation mechanism of claim 6, wherein said preventing means includes a stopper having a sliding prevention plate extending into said housing which abuts against said drive plate when said preventing means is in said first position.

8. The manipulation mechanism of claim 7, wherein said button is disposed on a bottom portion of said housing and said stopper is disposed on a top portion of said housing.

9. The manipulation mechanism of claim 7, further comprising guide means for guiding said button to allow said button slide in said housing, wherein said guide means includes a stopper for stopping said inward movement of said button after said pair of locking means have been unlocked.

10. The manipulation mechanism of claim 4, further comprising guide means for guiding said button to allow said button to slide in said housing, wherein said guide means includes a stopper for stopping said inward movement of said button after said pair of locking means have been unlocked.

11. The manipulation mechanism of claim 7, further comprising slide means for slidably supporting said preventing means such that it can be slid with respect to said housing, said slide means being separate from said slide prevention plate.

\* \* \* \* \*